(12) United States Patent
Urban

(10) Patent No.: US 7,207,748 B1
(45) Date of Patent: Apr. 24, 2007

(54) WATER COLLECTION AND DISTRIBUTION SYSTEM FOR YARD MAINTENANCE

(76) Inventor: Mark C. Urban, 12709 Powell Rd., Wake Forest, NC (US) 27587

( * ) Notice: Subject to any disclaimer, the term of this patent is extended or adjusted under 35 U.S.C. 154(b) by 214 days.

(21) Appl. No.: 10/908,164

(22) Filed: Apr. 29, 2005

(51) Int. Cl.
   *E02B 11/00* (2006.01)

(52) U.S. Cl. .......................... 405/51; 405/36; 405/53; 137/357; 137/565.37

(58) Field of Classification Search .................. 405/36, 405/37, 39, 51, 52, 53; 137/357, 565.01, 137/565.37; 210/170.03
See application file for complete search history.

(56) References Cited

U.S. PATENT DOCUMENTS

| | | | |
|---|---|---|---|
| 1,473,358 A | 11/1923 | Probst | |
| 4,228,006 A * | 10/1980 | Hanna | 210/167.3 |
| 4,527,927 A | 7/1985 | Bucherre | 405/53 |
| 4,934,404 A | 6/1990 | DeStefano | 137/357 |
| 5,234,286 A | 8/1993 | Wagner | 405/53 |
| 5,239,794 A | 8/1993 | Klein | 52/169.6 |
| 5,735,304 A * | 4/1998 | Chumley | 137/15.01 |
| 5,873,383 A | 2/1999 | Takai et al. | 137/357 |
| 6,264,832 B1 | 7/2001 | Panahi | 210/127 |
| 6,663,769 B2 | 12/2003 | Hosoya | 210/104 |
| 6,818,127 B1 | 11/2004 | Ketrow | 210/170 |
| 6,941,702 B1 * | 9/2005 | Abrams et al. | 52/16 |
| 7,025,076 B2 * | 4/2006 | Zimmerman et al. | 137/1 |
| 7,066,197 B1 * | 6/2006 | Gray et al. | 137/357 |
| 2004/0040598 A1 | 3/2004 | Robert | 137/357 |
| 2005/0051495 A1 * | 3/2005 | Bowers et al. | 210/714 |
| 2006/0021943 A1 * | 2/2006 | Gannon et al. | 210/663 |

* cited by examiner

*Primary Examiner*—Frederick L. Lagman
(74) *Attorney, Agent, or Firm*—Mills Law Firm PLLC

(57) ABSTRACT

A water collection and distribution system for yard maintenance includes a buried reservoir for collecting water from the roof of a structure and a submersed pump in the reservoir for supplying contained water to a pressurized manifold having outlets available for yard maintenance activities. One of the outlets is connected with a premix catch basin upstream of the reservoir in which additives may be mixed for storage in and dispensing from the reservoir. Another outlet is connected to spray nozzles in the reservoir for agitating the additive mixture.

10 Claims, 3 Drawing Sheets

WATER COLLECTION AND DISTRIBUTION SYSTEM FOR YARD MAINTENANCE

FIELD OF THE INVENTION

The present invention relates to water management systems for collecting, storing and distributing runoff water for comprehensive use.

BACKGROUND OF THE INVENTION

Water collection systems for storing runoff water from roofs have been proposed for varying usages. Such systems permit the storage during periods of heavy precipitation for use to supplement water utility usage during dryer periods. Both potable water and agricultural uses have been proposed and the systems tailored to the specific needs. Generally, the water is collected at the gutters from the roof runoff and directed through downspouts and conduits to an underground storage tank. The collected water may be purified and used for potable water as disclosed in U.S. Pat. No. 6,663,769 to Hosoya, or used for irrigation as disclosed in U.S. Pat. No. 5,234,286 to Wagner.

There are many areas, however, where the rainfall is rather steady throughout the year and where the need for singular use collection systems is not compelling, but where in the interests of conservation utilitarian uses are desirable. The average homeowner has ongoing and seasonal yard care needs for lawns, gardens, shrubbery and other discrete areas having intermittent water needs. In addition to watering, these require periodic attention with fertilizers and other additives that vary throughout the course of the year. U.S. Pat. No. 4,934,404 to DeStefano discloses a water collection system wherein a port in a downspout is used for the addition of fertilizers and nutrients for an irrigation field. Inasmuch as such additives are often granular and generally concentrated, there is no assurance when and if they will transit the connecting conduit to the reservoir thereby rendering the concentration uncertain. Further, there is no assurance of uniform mixing inasmuch as the additives are deposited on the reservoir water without mixing. Further, only modest screening of the runoff water is provided by a screen at the eaves, and accordingly finer sediment is transferred to the reservoir where it will accumulate and contaminate the contents. The construction of the reservoir makes removal of the accumulations difficult with no solution proposed. As a result, other than providing watering capability, the ability of the system to provide reliable landscape additives is problematic.

BRIEF SUMMARY OF THE INVENTION

The present invention provides a comprehensive water runoff collection system having a controlled addition and mixing of soluble additives enabling through multiple formats the reliable distribution to select portions of the landscape. Therein, the runoff water from the roof of a structure is initially routed to an accessible premix catch basin whereat any debris and sediment is settled for convenient periodic removal. The premix catch basin is connected with a main buried reservoir by a connecting conduit including an inline filter for removing remaining suspended sediment, thus ensuring that only filtered water is transferred thereto. Water from the reservoir is transferred by a submersed pump to a pressure manifold having plural valved outlets enabling use in varying modes, including fixed sprinkling systems, mobile hose outlets, and local structure water applications. The manifold further includes an outlet connected to a mixing head in the premix catch basin for the preliminary mixing of additive solutions, without requiring runoff water from the roof. This outlet also assists in the cleaning of accumulations from the premix catch basin. The manifold further includes mixing jets in the main reservoir for providing agitation for a uniform additive solution. Throughout the change of seasons, the desired additives can be added for all aspects of landscape care. Seasonal changes in the additives can be added to the residual contents compatibly. To prevent dilution, a bypass line is provided at the premix chamber to divert runoff water after an additive solution has been prepared.

DESCRIPTION OF THE DRAWINGS

The above and other features and advantages of the invention will become apparent upon reading the following detailed description taken in conjunction with the accompanying drawings in which.

DETAILED DESCRIPTION OF THE PREFERRED EMBODIMENT

Figure 1:
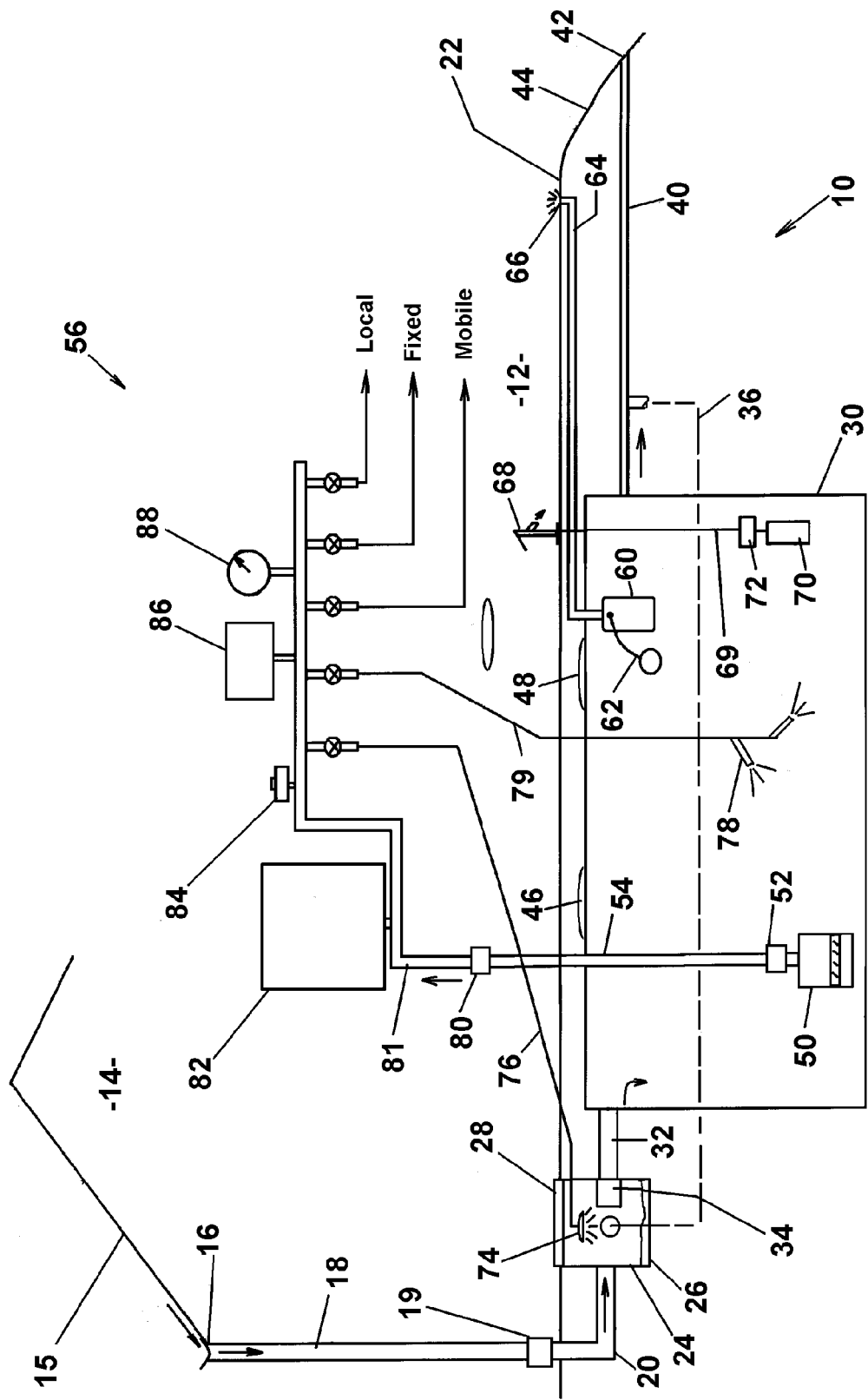
FIG. 1 is a schematic diagram of a water collection and distribution system in accordance with an embodiment of the invention.

Referring to the drawings, FIG. 1 illustrates a water collection and distribution system 10 providing water and additive solutions for use in maintenance activities around a yard 12 surrounding a structure 14. The system 10 collects water running from the roof 15 of the structure 14 into a gutter system 16 discharging into one or more downspouts 18. A preliminary filter screen may be placed at the top of the downspout for partially eliminating debris from the system. The system may be used in connection with pitched or non-pitched roofing systems for commercial and residential structures using conventional components.

Water flowing through the downspout 18 is routed at coupling 19 to supply conduit 20 below the surface of the surrounding ground level 22 of the yard and having an outlet at a buried premix catch basin 24. The catch basin 24 has a bottom upwardly opening cavity covered with a removable hatch 28. Runoff water from the roof may contain debris that is settled at the bottom catch basin. The hatch 28 may be opened for the periodic removal of the settled debris. The hatch 28 may be solid and generally flush with the surrounding ground or grated for accepting ground runoff water. Catch basins suitable for use are commercially available.

Figure 4:
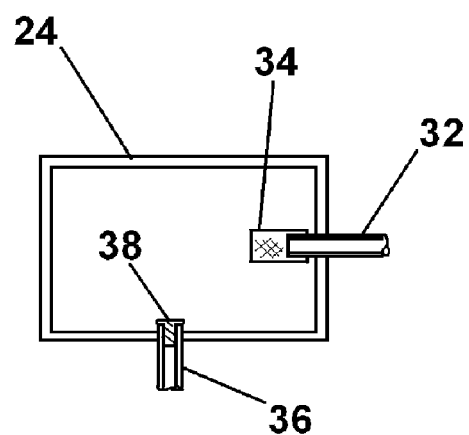
FIG. 4 is a top view of the catch basin of the collection and distribution system.

The catch basin 24 has an outlet fluidly connected with a collection reservoir 30 buried below ground level by connecting conduit 32. Referring additionally to FIG. 4, a filter 34 is connected to the inlet of the connecting conduit 32 for the filtering of remaining particulates in the water. The filter 34 is located in the catch basin 24 at the inlet of the connecting conduit 32 for facilitating the servicing thereof. A branch or bypass conduit 36 has an inlet located in the catch basin. A plug 38 is insertable into either the inlet of the connecting conduit or the bypass conduit to selectively block flow therethrough. When it is desired to route the runoff into reservoir 30 for filling, the plug 38 is removed from conduit 32 and inserted at the bypass conduit 36. When it is desired to block flow to the reservoir when a prepared mixture is being held, the plug is switched to the conduit 32 and the runoff is directed to the bypass conduit 36. The bypass conduit 36 has an outlet connected to a drainage conduit 40. The drainage conduit 40 has an entrance at the top of the reservoir 30 and an exit 42 on a grade 44 at a level below the top of the reservoir 30.

The reservoir 30 is buried below ground level 22. The reservoir 30 is formed of a suitable water resistant material, such as fiberglass or plastic, having a capacity suitable for handling the anticipated roof runoff. The reservoir includes a pair of manholes or hatches 46, 48 below ground level. Personnel can enter the reservoir through the hatches for installation and maintenance. A main submersible pump 50 is installed in the reservoir and vertically positioned, by suitable means, adjacent the base of the reservoir 30. The pump 50 includes an outlet connected to a check valve 52 and through supply conduit 54 to a pressurized distribution manifold 56. A secondary overflow pump 60 is installed in the reservoir and vertically positioned by suitable means, adjacent the upper portion of the reservoir. The overflow pump 60 is connected by distribution conduit 64 to a distribution head 66 and is operative to distribute excess water to the ground. The pump 60 may function in parallel with the drainage conduit 40 to limit fluid level in the reservoir under high runoff conditions or to function in lieu of the drainage conduit when an appropriate grade is not available.

A hand pump 68 is provided for manually pumping water from the reservoir for intermittent needs. The hand pump 68 is connected by hand pump conduit 69 to a foot valve strainer 70 and check valve 72 adjacent the base of the reservoir 30.

A mixing head 74 is disposed in the catch basin 24 and connected with the distribution manifold 56 by branch line 76. The mixing head 74 supplies water for cleaning and mixing as described below. A jet mixer 78 is disposed in the reservoir 30 and connected to the distribution manifold 56 by branch line 79 for supplying water for agitation and mixing, also as described below.

Figure 2:
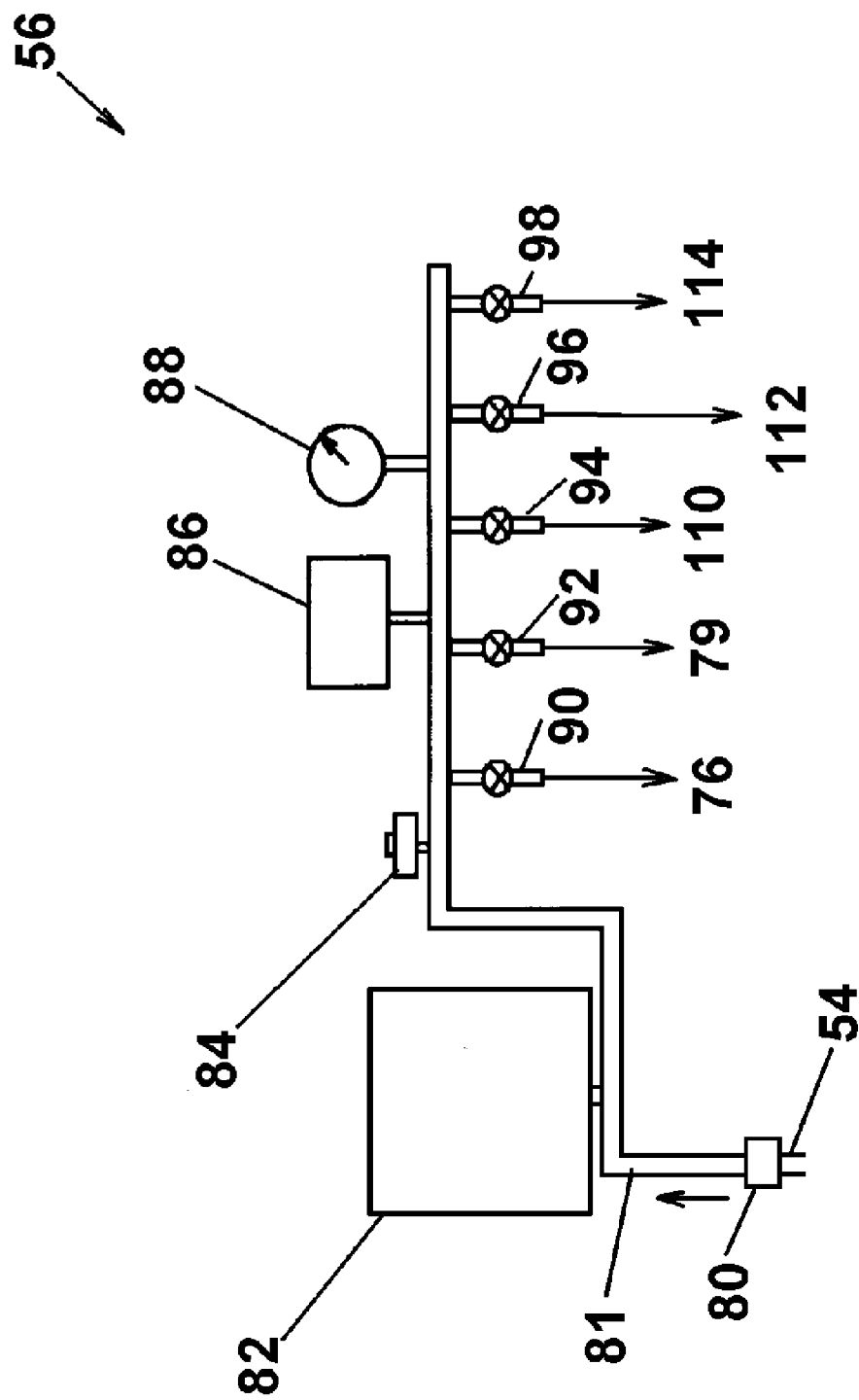
FIG. 2 is a schematic diagram for the distribution manifold of FIG. 1.

Referring to additionally to FIG. 2, the distribution manifold 56 is fluidly connected with supply conduit 54 at coupling 80. The distribution manifold 56 may be located interior or exterior of the structure 14. For control of fluid pressure, the main line 81 of the manifold 56 includes a pressure tank 82, pressure relief valve 84, automatic on/off and low-pressure cutoff switch 86 and pressure gage 88. Branch lines 90, 92, 94, 96, and 98 are connected in parallel with the main line 81. Each branch line includes a manual control valve. Branch line 90 is connected with line 76 to the mixing head 74. Branch line 92 is connected with line 79 to the jet mixer 78. Branch line 94 is connected to an outlet 110 for "mobile" use in connection with a hose for variable location watering. Branch line 96 is connected to a "fixed" location application, such as a sprinkler on irrigation system 112. Branch line 98 is connected to an outlet 114 for "local" use at the structure 14.

Figure 3:
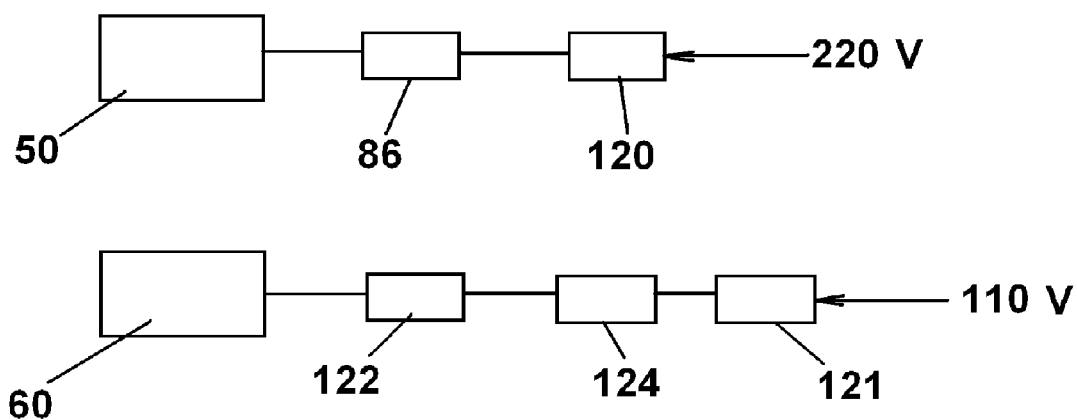
FIG. 3 is a schematic diagram of the control system for the pumps in the collection and distribution system.

Referring additionally to FIG. 3, the pump 50 is connected to a 220 volt power supply 120. The pump 50 is controlled by pressure switch 86 for operation between high and low line pressures and cutoff if the pressure drops below a determined level. The pump 60 is connected to a 110 volt power supply 121 and controlled by float switch 122 associated with the float 62. A manual cutoff switch 124 is provided for disabling pump operation.

The present invention thus provides a system for comprehensively utilizing runoff water. The system may be used for the collection of filtered water in the main reservoir for delivering water from the manifold 56 for "local" use through line 98 at outlet 114, "mobile" use 110 through hose line 94, and "fixed" watering systems 112 through line 96. If during such accumulation excessive water is presented to the reservoir, the excess is removed by pump 60 and/or drainage line 40 thereby eliminating hydrostatic conditions leading to leakage or reservoir rupture. When fertilization or other additive treatment for landscape maintenance is desired, the desired additive is deposited in the premix catch basin 24, and the premix line opened to solubilize the additives for transfer to the reservoir and the mixing jets 78 opened to uniformly mix the solution. To maintain the desired concentration, the plug in the catch basin is opened for transferring any incoming water to the discharge line 36. The additive solution may thereafter be dispensed according to the desired application form, using the spigot, hose or irrigation system. When a revised formulation is desired, the mixing is repeated with the new formulation generally being compatible with the residual solution in the reservoir. To ensure high purity in the reservoir, the catch basin may be cleaned periodically and the mixing head used for flushing. The filter screen may be serviced or replaced as necessary.

Having thus described a presently preferred embodiment of the present invention, it will now be appreciated that the objects of the invention have been fully achieved, and it will be understood by those skilled in the art that many changes in construction and widely differing embodiments and applications of the invention will suggest themselves without departing from the sprit and scope of the present invention. The disclosures and description herein are intended to be illustrative and are not in any sense limiting of the invention, which is defined solely in accordance with the following claims.

What is claimed is:

1. A system for collecting and distributing water from the roof of a structure for distribution for maintenance activities about a ground area surrounding the structure, said system comprising: a first reservoir having an upwardly opening cavity for receiving the water from the roof and a removable cover overlying said cavity; a second reservoir having an internal compartment fluidly connected with said first reservoir and receiving water therefrom; filter means associated with the first reservoir for filtering particulates in water flowing to said second reservoir; pump means in said internal compartment of said second reservoir, said pump means having a pump inlet adjacent the bottom of said compartment and a pump outlet for delivering water flow to a manifold assembly exterior of said second reservoir; means operatively associated with said manifold for maintaining fluid pressure therein; a first outlet at said manifold assembly operable for delivering water to said first reservoir for assisting cleaning said first reservoir and for mixing with additives transferred to said cavity for making an admixture for a maintenance activity; a second outlet at said manifold assembly operable for delivering water to said second reservoir for fluidly agitating an admixture therein; and a plurality of supplemental outlets at said manifold assembly for connection with devices for supplying water to maintenance activities.

2. The system as recited in claim 1 wherein a bypass line is fluidly connected with between said first reservoir and a discharge location, and further including means for selectively blocking flow to said second reservoir and permitting flow in said bypass line thereby preventing dilution of an admixture in said second reservoir.

3. The system as recited in claim 2 including overflow means for limiting fluid level in the second reservoir, said means for limiting including a discharge line having an inlet adjacent the top of the second reservoir and a discharge location.

4. The system as recited in claim 3 wherein said discharge location is located at a lower elevation in said yard for gravity flow therethrough.

5. The system as recited in claim 3 including second pump means fluidly connected with said discharge line and has an outlet at said discharge location connected with a device for distributing water therefrom.

6. The system as recited in claim 5 including float means operatively associated with said second pump means for limiting said fluid level.

7. A method for collecting and applying water additives to the landscape on a yard area around a structure comprising the steps of: routing water from the roof of the structure through a supply conduit to in a main reservoir below ground level; providing a premixing reservoir accessible at ground level in said supply conduit between said roof and said main reservoir; pumping water with a submerged pump in said main reservoir to a manifold assembly; providing means for pressurizing the water in the manifold assembly; providing a normally closed first outlet line on said manifold assembly having an outlet in said premixing reservoir; supplying an additive to said premix reservoir; opening said first outlet line to deliver water to said premix reservoir for forming and admixture with said additive; transferring said admixture to said main reservoir; after said transferring blocking flow between said premix reservoir and said main reservoir to prevent dilution of the admixture by additional water from the roof; and providing a normally closed second outlet line on said manifold assembly having an outlet at a discrete location at said yard area.

8. The method as recited in claim 7 including the step of routing subsequent to said blocking water from the roof of the structure in a bypass line to a discharge location.

9. The method as recited in claim 8 of providing a normally closed third outlet line on said manifold assembly having an outlet in said main reservoir, and opening said third outlet line to provide a fluid flow for promoting the mixing of said admixture.

10. The method as recited in claim 9 including the step of providing an overflow line at said main reservoir having an inlet adjacent the top of said main reservoir and an outlet at a discharge location in said yard, providing second pump means having an outlet fluidly connected with said overflow line and operative to maintain the fluid level in the main reservoir at or below a selected fluid level.

* * * * *